(12) United States Patent
Gemelos (10) Patent No.: US 8,077,609 B2
(45) Date of Patent: Dec. 13, 2011

(54) METHOD FOR PROVIDING QUALITY-OF-SERVICE BASED SERVICES IN A PACKET NETWORK

(75) Inventor: Steven Gemelos, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 701 days.

(21) Appl. No.: 11/304,468

(22) Filed: Dec. 15, 2005

(65) Prior Publication Data

US 2007/0140113 A1    Jun. 21, 2007

(51) Int. Cl.
*G01R 31/08*   (2006.01)

(52) U.S. Cl. .................................. 370/230; 370/235

(58) Field of Classification Search .................. None
See application file for complete search history.

(56) References Cited

U.S. PATENT DOCUMENTS

| | | | |
|---|---|---|---|
| 5,381,413 A | 1/1995 | Tobagi et al. | |
| 5,463,624 A | 10/1995 | Hogg et al. | |
| 5,499,238 A | 3/1996 | Shon | |
| 5,570,360 A | 10/1996 | Klausmeier et al. | |
| 5,629,937 A | 5/1997 | Hayter et al. | |
| 6,577,628 B1 | 6/2003 | Hejza | |
| 6,754,177 B1 | 6/2004 | Gersht et al. | |
| 6,763,392 B1 * | 7/2004 | del Val et al. | 709/231 |
| 6,859,438 B2 | 2/2005 | Haddock et al. | |
| 7,032,241 B1 | 4/2006 | Venkatachary et al. | |
| 7,756,024 B1 * | 7/2010 | Croak et al. | 370/230 |
| 2002/0002622 A1 * | 1/2002 | Vange et al. | 709/245 |
| 2002/0059170 A1 * | 5/2002 | Vange | 707/1 |
| 2004/0208186 A1 * | 10/2004 | Eichen et al. | 370/401 |
| 2004/0215817 A1 * | 10/2004 | Qing et al. | 709/238 |
| 2004/0260811 A1 * | 12/2004 | Cherkasova | 709/225 |
| 2005/0005004 A1 * | 1/2005 | Sugauchi et al. | 709/223 |
| 2005/0083848 A1 * | 4/2005 | Shao et al. | 370/238 |
| 2006/0039333 A1 * | 2/2006 | Pirzada et al. | 370/338 |
| 2006/0114855 A1 * | 6/2006 | Zheng | 370/331 |
| 2006/0149845 A1 * | 7/2006 | Malin et al. | 709/228 |
| 2006/0203722 A1 * | 9/2006 | Oommen | 370/229 |
| 2006/0209891 A1 * | 9/2006 | Yamada et al. | 370/468 |
| 2007/0107024 A1 * | 5/2007 | Versteeg et al. | 725/95 |
| 2008/0205435 A1 * | 8/2008 | Nahumi et al. | 370/463 |

OTHER PUBLICATIONS

International Search Report and Written Opinion of the International Searching Authority; PCT/US06/61845, 7 pages; Sep. 26, 2007.

* cited by examiner

*Primary Examiner* — Hassan Phillips
*Assistant Examiner* — Eunsook Choi
(74) *Attorney, Agent, or Firm* — Jackson Walker L.L.P.

(57) ABSTRACT

The disclosure provides a system and method for providing a service in a packet-switched network at a selected Quality of Service (QoS) level. The method includes receiving a request for a service from a customer gateway at server connected to the packet-switched network; correlating the requested service to available network resources; and enabling the network to provide the requested service based on a result of the correlation.

17 Claims, 6 Drawing Sheets

METHOD FOR PROVIDING QUALITY-OF-SERVICE BASED SERVICES IN A PACKET NETWORK

BACKGROUND OF THE DISCLOSURE

1. Field of the Disclosure

The present disclosure relates to the field packet-switched networks.

2. Description of the Related Art

Packet-switched networks, such as Digital Subscriber Loop (DSL) networks, are used by service providers to provide a variety of services, such as Internet access, Voice over Internet Protocol (VoIP), Internet Protocol Television (IPTV), Video on Demand (VoD), etc. Often, service level agreements (SLAs) are made that specify quality of service (QoS) levels for the various services provided to the customers. The specified QoS levels or the service levels set by the service provider may be different for different services. For example, the QoS level for a voice service, such as VoIP, may be higher than the QoS level for a data service, such as the access to the Internet.

The ability to meet specific QoS level of a service depends upon a number of factors, such as the current load on the network and the capacity and condition of the various network elements, such as servers, routers, switches, the transport links that link the various network elements to the customer premise equipment (CPE). In many situations, the network may not be able to provide the requested services at the selected or desired QoS levels to all customers. If the network is overloaded, the quality of service may fall below an acceptable level for all the customers being serviced by the associated network. In some instances, such an approach may be acceptable for data traffic, such as Internet traffic, where in the long term the QoS levels are met and the effect in the short term can be tolerated, but not for the voice service.

Quality of service mechanisms have been implemented in routers and switches in an effort to provide differentiated services in packet-switched networks. These mechanisms generally operate by differentiating the data packets ("packets") as they arrive at the router or switch, separating the packets into queues for each type of service, and then servicing each queue with a different priority to provide the desired service at a QoS level. These QoS mechanisms alone do not tend to control or police the access to the network and leave the network susceptible to overloading by a convergence of too many customers. Using a video service as an example, as the number of video service requests grows, even with a queuing scheme on video servers, the routers and switches can be overloaded, thus degrading the QoS level for all of the customers. Thus, there is a need for an efficient system and method for managing the traffic on a network so as to maintain the QoS at selected levels.

BRIEF DESCRIPTION OF THE DRAWINGS

For detailed understanding of the present disclosure, references should be made to the following detailed description of an exemplary embodiment, taken in conjunction with the accompanying drawings, in which like elements have been given like numerals.

DETAILED DESCRIPTION OF THE DISCLOSURE

In view of the above, the present disclosure through one or more of its various aspects and/or embodiments is presented to provide one or more advantages, such as those noted below.

The present disclosure provides a system and method for managing traffic on a packet-switched network. In one aspect, the system controls customer access to the network so as to provide the requested services at selected QoS levels. In one aspect, the request for a service from a customer is routed to a server referred to herein as a Quality of Service (QoS) server that determines whether the network resources are available to provide the requested service at a selected QoS level, and provides the customer an access to the network if the network resources are available. In another aspect, the system notifies the customer if the access to the requested network service is denied.

In one aspect, the QoS server determines an overall load on the network to determine the network availability. In another aspect, the QoS server correlates the requested service to the available network resources. The requested service may be characterized by a QoS profile having one or more parameters, and each network element may be characterized by the value of one or more network metrics. The requested service may be correlated to the available network resources by comparing at least one parameter of the QoS profile of the requested service to a value of at least one metric of a network element. Network resources may be checked for availability by obtaining at least one value of a metric of a network element upon receiving a service request. Alternatively, network resources may be tracked by periodically or continuously updating values of the metrics stored in a database accessible to the QoS server. Updating may be done by any server, including the QoS server. In one aspect, the decision whether to allow the requested service may be performed based on a correlation of the requested service with network elements at one of a front-end, middle, and a back-end of the network. The decision maybe made on whether a metric meets a selected criterion.

The present disclosure further provides a system for enforcing a policy for the delivery of a broadband service. The system includes a packet-switched network for delivering a broadband service to a customer and a Quality of Service (QoS) server connected to the packet-switched network for monitoring a value of a pre-defined metric of the packet-switched network. The QoS server includes a database for storing real-time values of metrics of the packet-switched network, a processor, and a computer-readable medium that contains a set of instructions operative to cause a computer to execute a method. The set of instructions describes a method that includes: receiving a request for a service; correlating the requested service to available network resources; and making a decision to provide the access to the requested service based on a correlation result. The requested service may be correlated to available network resources by comparing at least one parameter of a QoS profile of the requested service to the value of at least one metric of a network element. A further set of instructions enables obtaining a value of at least one metric of a network element upon receiving a service request. A further set of instructions enables tracking available network resources by continuously updating a value of a metric stored in a database at the QoS server. The value of the metric may be updated in accordance with a change in the state of the network administered by the QoS server. In one aspect of the disclosure, the computer-readable medium of the QoS server further includes a set of instructions for performing a decision based on correlation of the requested service with an element at one of a front-end, middle, and a back-end of the private network. The QoS server typically notifies the customer of the decision.

Figure 1:
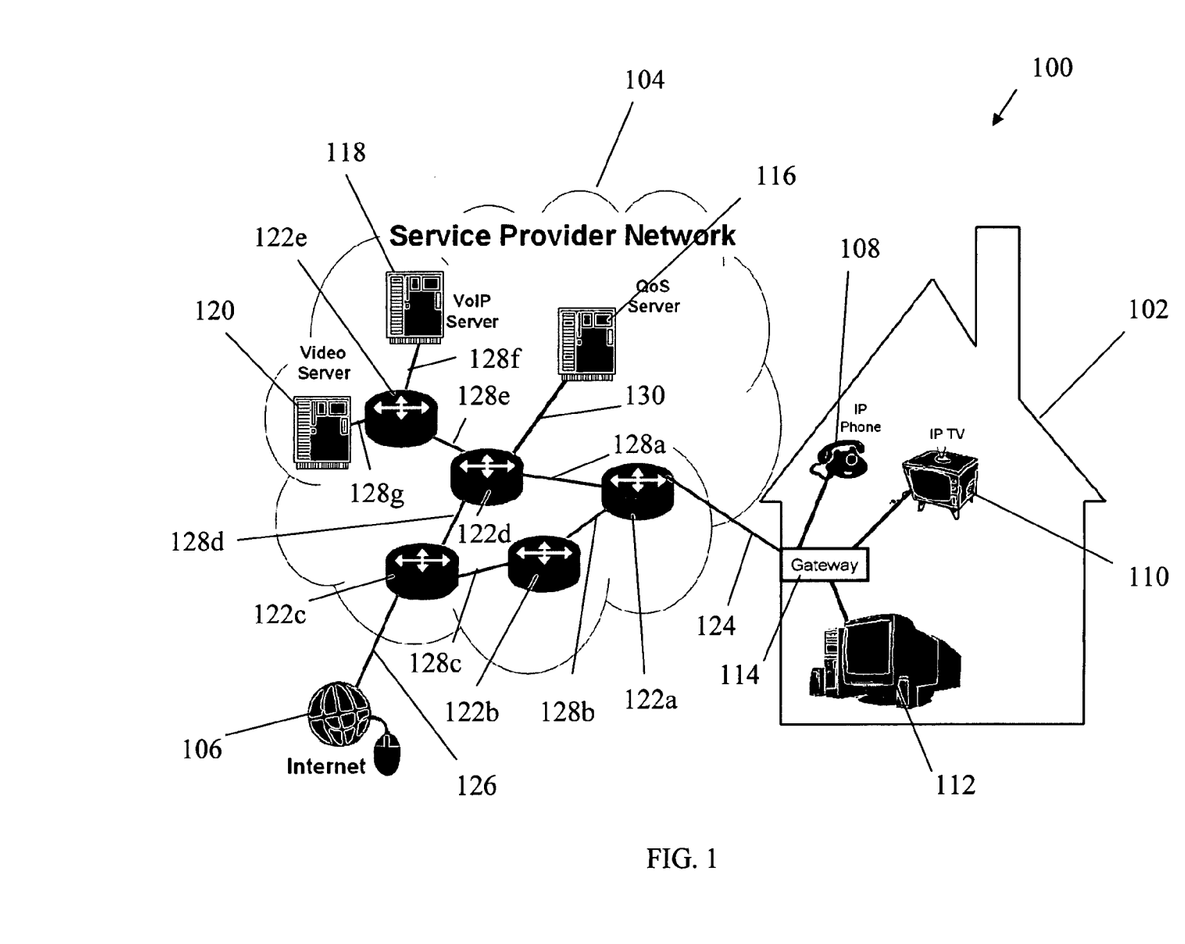
FIG. 1 illustrates exemplary network architecture that may be used to provide services to a customer according to one embodiment.

FIG. 1 illustrates an exemplary system or network architecture 100 that may be used to provide the services to customers. The network 100 includes a service provider packet-switched network 104 that is adapted to provide the packet-switched services, such as the internet access, VoIP, IPTV, VoD, etc. to customers, such as customer 102, via a link 124. The network 104 is coupled to the Internet 106 via a link 126 and provides a data connection between the Internet 106 and the customer location 102. The customer location typically includes various customer premises equipment (CPE) designed to access a variety of services from the network 104. As shown in FIG. 1, an exemplary CPE may include an Internet Protocol Phone (IP Phone) 108 for transmitting and receiving voice content over the network 104 using, for instance, Voice over Internet Protocol (VoIP), a television set 110 for receiving and displaying a video content signal obtained from a the network, and a computer 112 for data transmission and reception, such as is commonly associated with an Internet connection, such as a Digital Subscriber Line (DSL) connection. The customer location 102 includes a Gateway 114 for providing a central customer interface with the network 104. A modem or a customer-side router are typical examples of Gateway devices.

The packet-switched network 104 may be a DSL network and may include one or more servers for providing one or more services to the customer gateway. One or more servers, such as a VoIP server 118, may provide a voice content to the IP Phone 108. One or more video servers, such as a video server 120, may provide a video content to the television 110. FIG. 1 shows an exemplary connection 126 to an outside network (i.e., Internet 106) that may enable the data content to be provided to the customer location. The network 104 further includes one or more switches 122 (122a-122e) that direct packets of data through the network 104 to their destination, for instance, from the video server 120 to the Gateway 114. The switches 112 may establish multiple paths for transmitting a signal between two points of the network. In one aspect of the disclosure, a switch 122 may also be a router, such as a core router of a network. The switches 122a-122e are shown connected to each other and the various network servers via links (also referred to as the transport links) 128a-128g, which may be physical links such as copper wires, fiber optic cables, etc.

In one instance, a switch 122 may be a Digital Subscriber Line Access Multiplexer (DSLAM). A DSLAM is a device used to provide DSL connections to multiple customer locations and to link multiple customer DSL connections into a single high-speed network, such as the network 104. The DSLAM generally aggregates signals from the multiple customers and separates these signals according to the signal type. For example, the DSLAM may separate voice signals and data signals, onto their appropriate networks, such as a voice network and a data network, respectively. For a DSL connection, the switch 122a directly connected to Gateway 114 is often a DSLAM. Connection or link 124 may be a DSL connection, such as an existing phone line.

The network 104 further includes a Quality of Service (QoS) server 116 which regulates and manages the traffic traversing the network 104. The QoS server 116 may regulate traffic by providing a requested service to a customer when the network resources or elements have the capacity to provide the requested service at a desired or selected quality of service level. The various elements of the network (i.e., the video server 120, VoIP server 118, physical links 128a-128g, switches 122a-122e, etc.) may be characterized by one or more metrics that quantitatively specify the operational nature of the network element. As an example, a router may have a specified maximum bandwidth. The amount of available bandwidth through the router at any time depends on the specified maximum bandwidth of the router as well as the amount of bandwidth taken up by services currently using that router. As another example, a copper wire and a fiber optic cable may have different associated bandwidths and different packet loss ratios.

Each service (i.e., data, voice, video) may have an associated QoS profile or service characterized by one or more performance parameters. The performance parameters indicate requirements of a network element to deliver the service to industry standards of an acceptable quality. As an example, a video service, which generally has a lot of content, requires a network connection with a high bandwidth and that may support a steady bit rate. As another example, a voice service does not carry as much content as a video service, but requires that the content be transmitted without substantial delay at the switches, etc. Thus, a network may transmit a voice service if it has a low amount of available bandwidth as long as it transmits the signal without substantial delay. In yet another example, Internet data (e.g., web pages, etc.) may operate effectively even in a network with low bandwidth and with considerable delay.

Some exemplary network metrics include bandwidth, Mean Packet Transfer Delay (delay), Packet Transport Delay Variance (delay jitter), Packet Loss Ratio, and Packet Error Ratio. Bandwidth refers to the width of a communication channel and may be quantified as a number of bits passing a point per unit of time (i.e., Megabits per second (Mbps)). Mean Packet Transfer Delay generally describes an average delay for a packet traveling between two reference points, such as two endpoints of a network or two points within a network. Packet Transport Delay Variance generally quantifies variations in delay times. Generally, a bounded value of the Packet Transport Delay Variance is required for streaming applications (i.e., voice, video) in order to provide a smooth presentation of the stream. Excessive variations in the delay may result in buffer overflows and/or underflows, thereby resulting in either retransmission of a packet or negatively affecting the video or voice service. The Packet Loss Ratio generally describes the ratio of the number of lost packets to the total number of transmitted packets. The Packet Error Ratio generally describes the ratio of the number of transmitted packets experiencing an error to the total number of packets transmitted. Excessive packet error or packet loss may result in significant packet retransmission and negatively affect voice or video streams. Diagnostic tests are available to determine values of these metrics.

Figure 2:
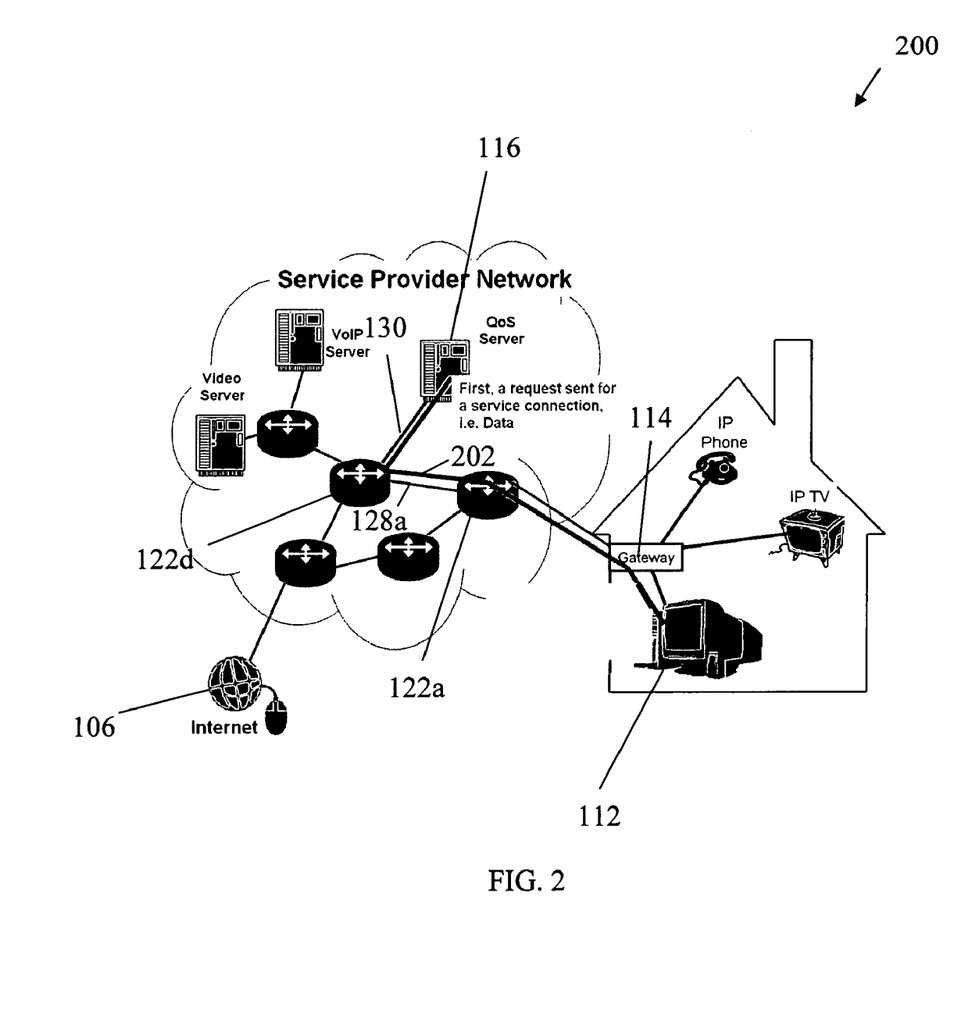
FIG. 2 illustrates one aspect of the present disclosure in which a customer requests a service over the network in FIG. 1.

FIG. 2 illustrates an aspect of the network 104 of the present disclosure in which a request from a customer gateway 114 is routed to the QoS server 116. As shown in FIG. 2, the request to the network 104 may originate from a customer computer 112 for an access to the Internet 106. The request is routed to the QoS server 116 by the network elements 122*a* and 122*d* via the links 128*a* and 130 respectively as shown by the line 202. The request may be considered as received or detected by the server 116 and the network 104 awaits an action from the QoS server 116 before taking any further action. The connection to the QoS server may be handled by a server in the network 104 or as a proxy through the Gateway. The request may take one or more forms. In one form, the request may describe the type of service being requested (e.g., Internet access, a video connection, a VoIP connection). In another form, the request may describe one or more parameters (e.g., continuous bandwidth, burst sizes, packet loss ratio, delay, delay jitter, etc.) of the QoS profile of the requested service.

Upon receiving the request, the QoS Server 106 determines whether the network 104 has the availability to provide the requested service at a selected QoS level. The QoS server may determine the current overall load on the network 104. If the load is below a threshold, the QoS server enables the network 104 to provide the requested service. The QoS server may correlate parameters of the QoS profile of the requested service with values of the network metrics. If the results of the correlation indicate that the network is able to support the service at a selected or pre-determined level of service quality, then the QoS server releases the request to the network so the appropriate network elements may provide the requested service. The QoS server also may deny the service if one or more of the network metrics is outside a norm or threshold. Thus, the QoS server in one aspect intercepts the customer request and releases the requests if the network 104 is capable of providing the requested services at the selected levels for those services.

The values of network metrics may be obtained at the time the request is received from a customer or may be maintained in a database accessible to the QoS server. The database may be periodically or continuously updated. One or more algorithms may be also be used by the QoS server to estimate the values of certain network metrics and provide the access if such estimates indicate that the network is capable to provide the service at a desired level of service. In one aspect, once a service request is received from the customer, the QoS server queries the network elements to return a real-time value of network metrics. Real-time values may be obtained by diagnostic testing (e.g., for testing copper wires, etc.) or by requesting a value from a database storing updated values at the appropriate network element, such as a database situated at a DSLAM or a database situated at a server. In another aspect of the disclosure, the QoS server continuously tracks the values of the metric of the network elements in a database at the QoS server and records any changes that occur in the value of the metric. When a service request is received, the QoS server may check parameters of the requested service against values of the metrics stored in the metric database of the QoS server. In one aspect, a change in the value of a network metric occurs whenever the QoS server performs an action, such as providing a service or ending a present service signal. Upon granting access, the QoS server updates the value of the metric at the QoS server to account for the effect of a provided service. When the service is terminated, the QoS server also updates the value of the metric to reflect the change.

Figure 3:
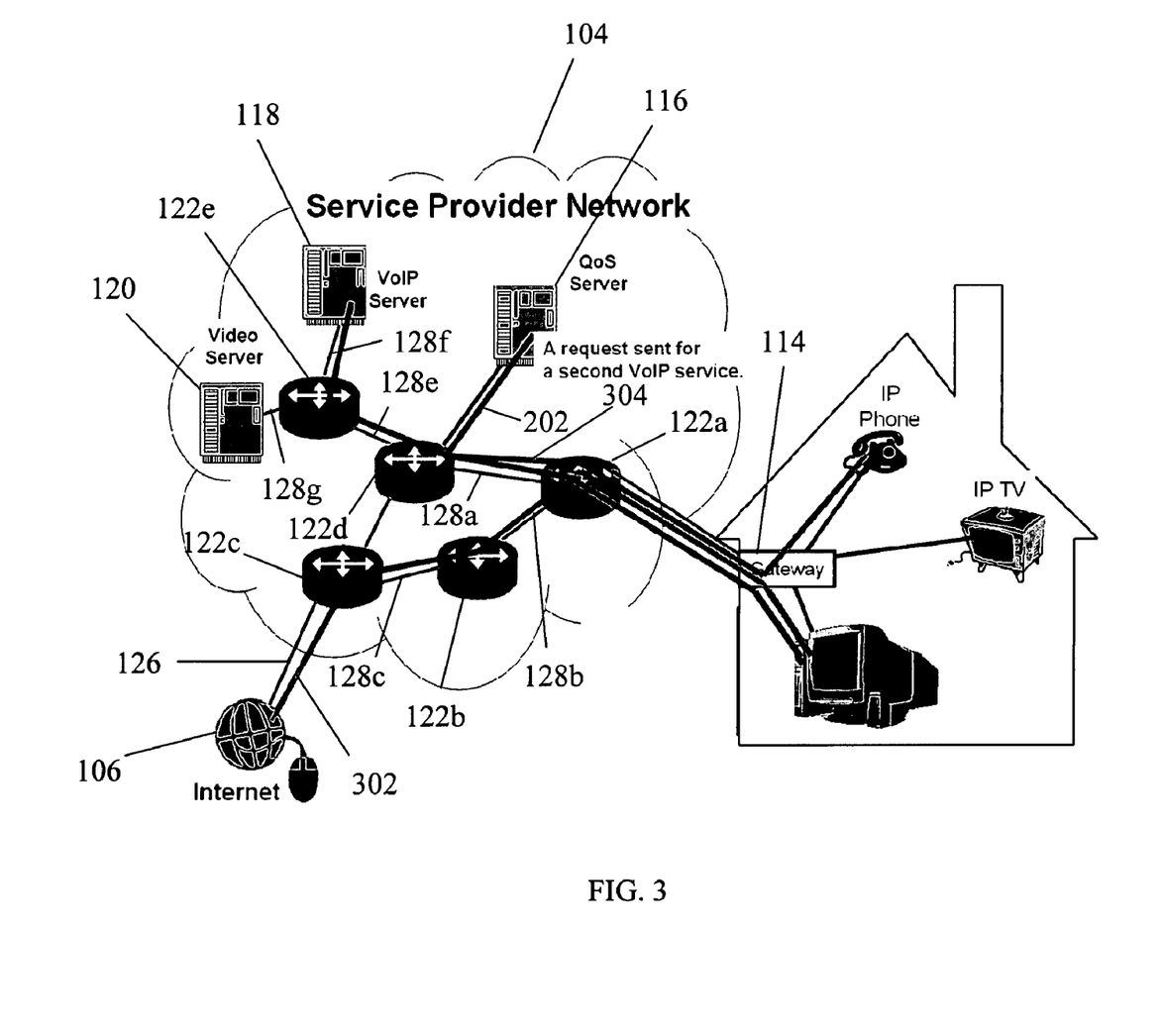
FIG. 3 illustrates an exemplary connection that may be established upon providing access to the customer from a QoS Server.

FIG. 3 illustrates an exemplary connection that may be established upon providing access to the customer from the QoS server 116. Once the QoS server grants access, it reroutes the customer to the appropriate server and may also notify the customer that the access has been granted. For example, if the request is for an access to the Internet 106, then once the access is granted by the QoS server 116, the network will establish the internet connection between the customer gateway 114 via the routers 122*a*, 122*b* and 122*c* over the links 128*b*, 128*c* and 126 as shown by the line 302. Similarly, if the request is made by the IPTV telephone, the network 104 will establish the voice connection between the VoIP server 118 and the customer gateway 114 via the routers 122*a*, 122*d* and 122*e* over the links 128*a*, 128*e* and 128*f* as shown by line 304. In the same manner, the network may establish an IPTV or VoD connection via the routers 122*a*, 122*d* and 122*e* over the links 128*a*, 128*e* and 128*g*.

Notification to the customer may take the form of a web page for a data connection or a dial tone for an IP Phone connection. If the QoS Server determines that the resources are not available to provide the requested service, the QoS Server may return an appropriate message to the customer to indicate that access is denied. For example, a request for VoIP service may return a busy signal, and a request for a data service may return an HTML page stating that the network resources are unavailable, etc.

Figure 4:
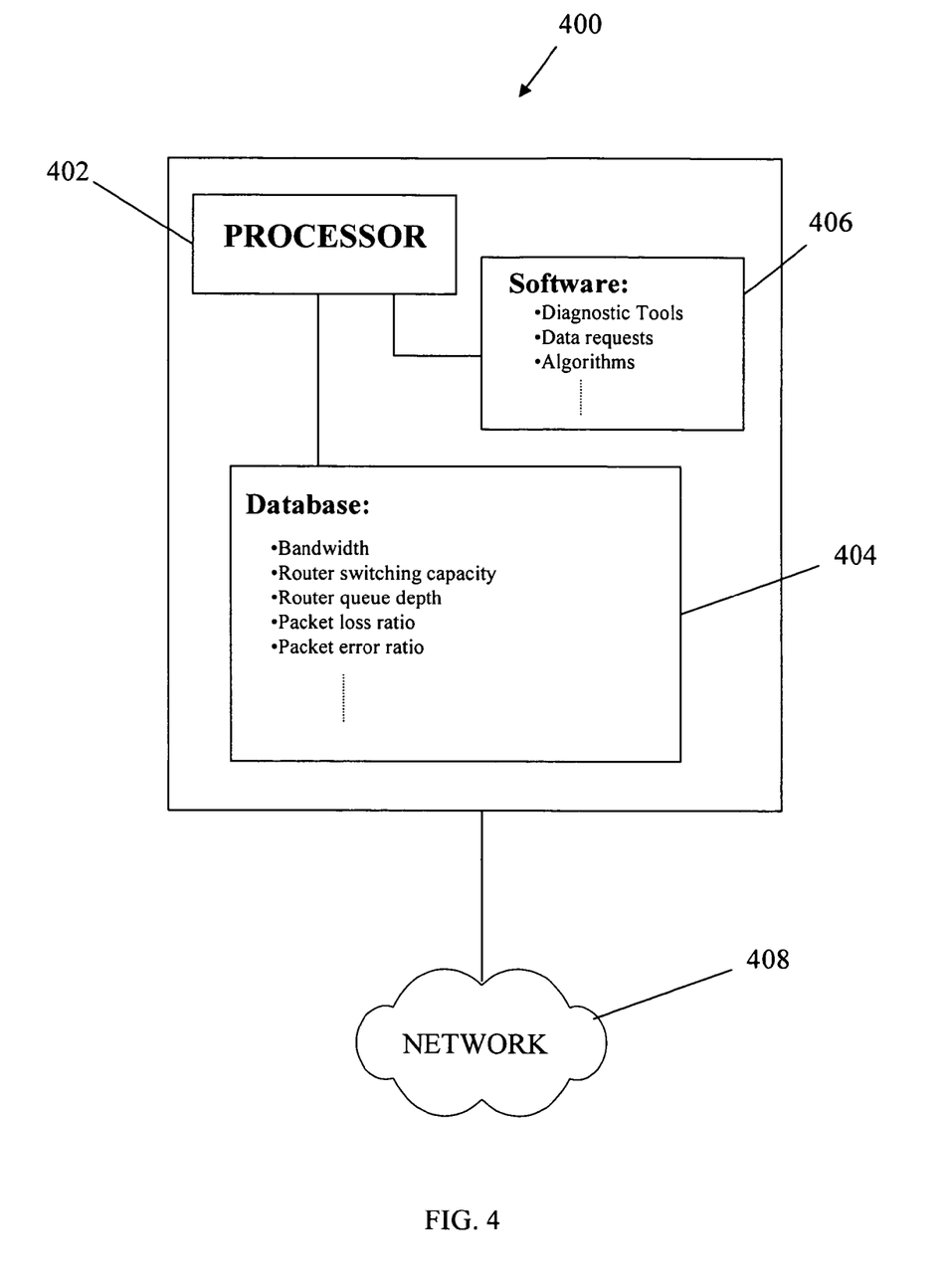
FIG. 4 illustrates a diagram of an exemplary QoS server according to one embodiment of the present disclosure.

FIG. 4 illustrates a block diagram of an exemplary QoS server 400 that may be utilized in the system of the present disclosure. The exemplary QoS server includes a metrics database 404 for storing values of metrics from various network elements (i.e., servers, links, switches), a processor 402 for performing calculations, and a database 406 of software and network diagnostic tests that may be implemented using the processor. The metrics database stores values of various metrics, such as bandwidth, router switching capacity, router queue depth, packet loss ratio, packet error ratio, etc., of one or more elements of the network 408. These values may be updated periodically to reflect a current state of the network. Values may be updated by using diagnostic tools to obtain the metric values or by requesting values from a database of an appropriate network element (e.g., router database, server database).

One or more software programs may provide diagnostic procedures for testing a network element, such as testing a bandwidth of a network link, for example. Another set of programs may request data stored at a network element, such as a server or a network switch. Another set of software programs may correlate values of network metrics with parameters of the QoS profile of the requested service to determine whether the value of the network metric meets a pre-determined threshold level.

In one instance, the QoS server may update the values stored in the metric database when it provides access to a service (or when a service link is terminated) by adding (or subtracting) the pre-determined values of the requested service. In yet another use, the metric database may store historical values of the metrics of the private network. The QoS server further includes a set of software programs which may be used by a network engineer to determine how to grow the network.

Figure 5:
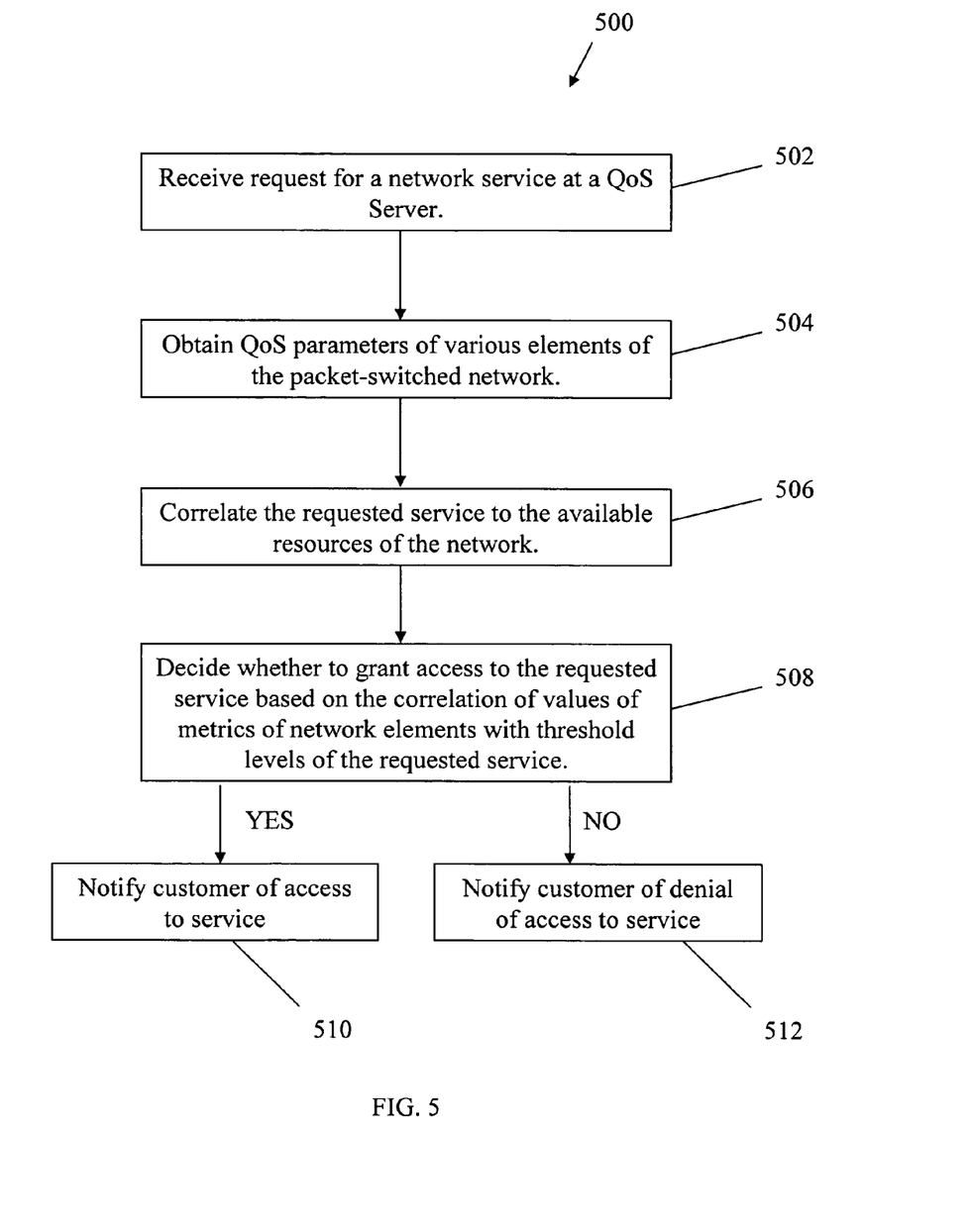
FIG. 5 illustrates a flowchart describing an aspect of the disclosure in which the QoS Server responds to a request for a service from a customer.

FIG. 5 illustrates a flowchart 500 describing an aspect of the disclosure in which the QoS Server responds to a service request from a customer. In Box 502, the QoS server receives a service request from a CPE device, such as a computer, IP Phone, IPTV device, etc. In Box 504, the QoS server obtains the value of the metrics of one or more network elements (i.e., switches, links, servers, etc.) of the private packet-switched network. In Box 506, the QoS server correlates the one or more parameters of the QoS profile of the requested service to at least one metric of the network. In Box 508, if the value of the pre-defined metric meets a threshold level of the requested service, then access to the requested service is granted.

In Box 510 in which the service is provided, the QoS server delivers an appropriate confirmation signal to the customer, such as a web page when data service is requested, or a dial tone to an IP Phone when a voice connection is requested, etc. Additionally, the QoS server redirects the service to the appropriate destination (i.e., video server, VoIP server, Internet connection, etc.) and assigns a priority bit to the service. If the QoS server does not grant access to the service (Box 512), the QoS server may deliver a message indicating that access is blocked. For example, if the requested service is a data connection, the QoS server may return a suitable web page with text indicating that access has been blocked. If the requested service is a VoIP connection, the QoS server may return a fast dial tone to indicate an inability to connect, etc.

In another aspect of the disclosure, the QoS server may correlate network metrics from a front-end, middle, or back-end of the network. For the exemplary purposes of the disclosure, the front-end may refer to the network elements providing a connection to the customer, such as the DSLAM and the DSL connection; the back-end may refer to the content servers, such as the video servers and voice servers; and the middle may refer to the internal switches and connecting links. As an example, the QoS server may check the front-end first before proceeding to a test of middle and back-end network elements. In this example, the QoS server may decide to deny access based on the DSL connection not having enough bandwidth. Alternatively, the QoS server may check back-end elements first and, for instance, deny access based on too many people trying to access a single video server.

By implementing the aspects of the disclosure, QoS guarantees and Service Level Agreements (SLAs) may be made for each individual service, and not necessarily for an entire port or connection. Each individual service may be handled individually. This enables control of how the services are loaded on the network resources and enables the network to efficiently provide these services. The methods described in the disclosure can prevent overloading of the network and enables different services to be transmitted at their selected or desired quality levels.

Additionally, the disclosure enables demand on the network to be measured by the number of service requests. This makes it easier to gauge the load on each of the network resources: link capacity, switch and router load, server load, etc. The network may thereby report how many services of each type were accepted, how many were blocked, and the limiting resource that caused each service to be blocked. This enables a network engineer to grow the network resources efficiently based on service demands.

Figure 6:
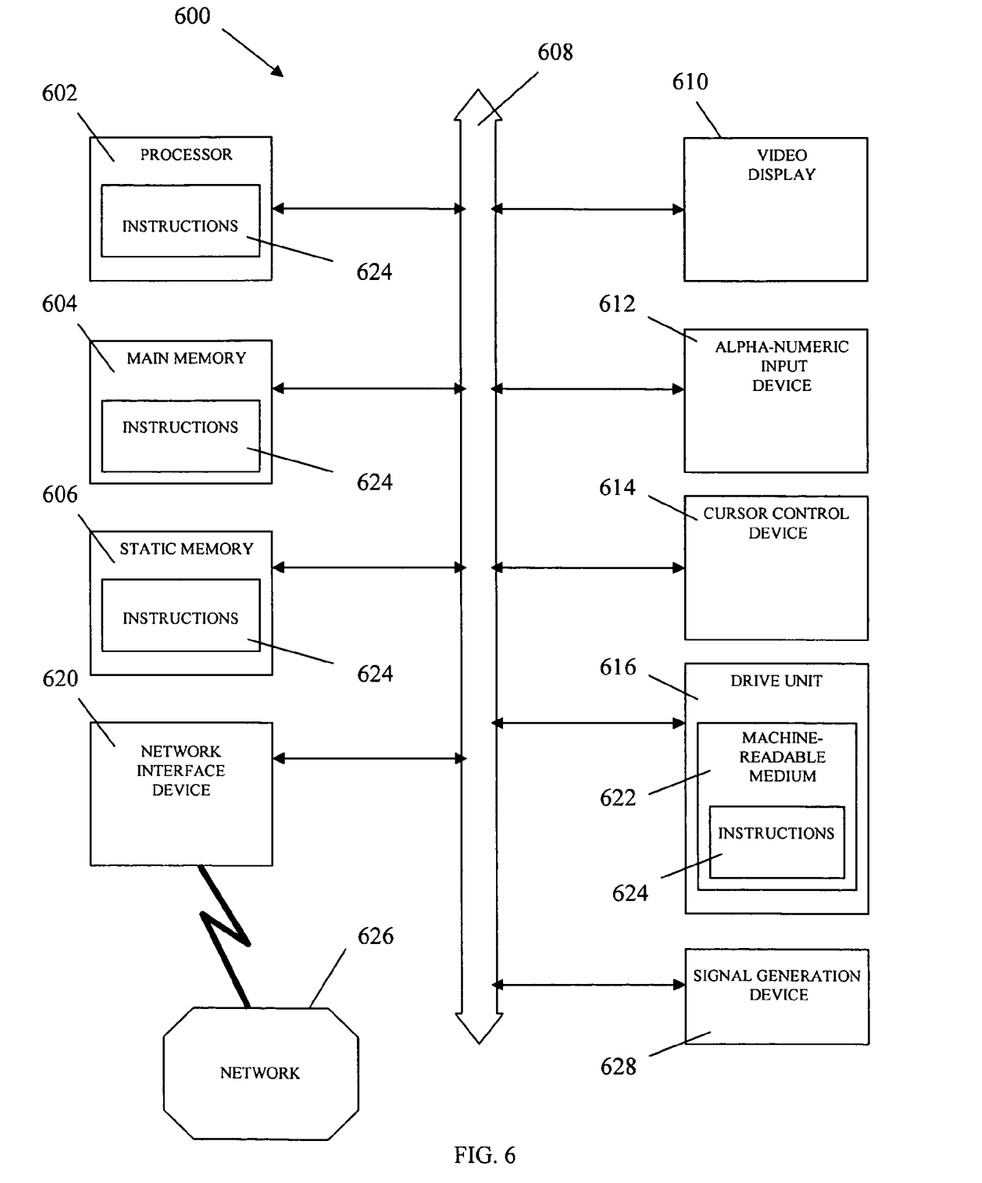
FIG. 6 is a diagrammatic representation of a machine in the form of a computer system within which a set of instructions, when executed, may cause the machine to perform any one or more of the methodologies discussed herein.

FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices may likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations may include, but not limited to, distributed processing or component/object distributed processing, parallel processing, or virtual machine processing may also be constructed to implement the methods described herein.

The present disclosure contemplates a machine readable medium containing instructions 624, or that which receives and executes instructions 624 from a propagated signal so that a device connected to a network environment 626 may send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the invention is considered to include any one or more of a machine-readable medium listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A non-transitory computer readable medium, accessible to a server, comprising program instructions executable by the server to:
   receive a request from a customer equipment for a service over a packet-switched network;
   determine an availability of the network to provide the service at a selected quality of service level wherein the program instructions to determine the availability including instructions to:
      estimate a current value of a front end metric selected from a group consisting of mean packet transfer delay, delay jitter, packet loss ratio, and packet error ratio and wherein the front end of the network includes a portion of the network between a digital subscriber line access multiplexer (DSLAM) and a gateway at a customer location; and
      estimate a value of a back end metric selected from the group consisting of mean packet transfer delay, delay jitter, packet loss ratio, and packet error ratio wherein the back end of the network includes a portion of the network between a video server and the DSLAM; and
   provide the service when the availability indicates the selected quality of service level.

2. The computer readable medium of claim 1, wherein the program instructions include program instructions to determine a load on network elements associated with providing the service.

3. The computer readable medium of claim 1, wherein the program instructions include program instructions to determine when providing the service degrades a Quality of Service level for other customers below a threshold.

4. The computer readable medium of claim 1, wherein the program instructions include program instructions to provide the service when the front end metric and the back end metric meet selected criteria.

5. The computer readable medium of claim 1, wherein the program instructions to determine the availability include program instructions to correlate the requested service to available network resources.

6. The computer readable medium of claim 1, comprising program instructions executable to notify, based on the availability, the customer equipment whether the request for the service was granted.

7. A method of providing a service in a packet-switched network, comprising:
   receiving a request for a service from a customer device;
   determining an availability of the network to provide the requested service at a selected quality of service level wherein determining the availability includes:
      estimating a value of a front end metric wherein the front end metric is selected from a group consisting of mean packet transfer delay, delay jitter, packet loss ratio, and packet error ratio and wherein the front end of the network includes a portion of the network between a digital subscriber line access multiplexer (DSLAM) and a gateway at a customer location; and
      estimating a value of a back end metric wherein the back end metric is selected from the group consisting of mean packet transfer delay, delay jitter, packet loss ratio, and packet error ratio wherein the back end of the network includes a portion of the network between a video server and the DSLAM; and enabling the network to provide the service when the availability indicates an ability to provide the service at the selected quality of service level.

8. The method of claim 7, wherein determining the availability comprises determining a current load on network elements providing the service.

9. The method of claim 7, further comprising enabling the network when the front end metric and the back end metric meet a selected criterion.

10. The method of claim 7, wherein the selected quality of service level is different for a voice service and a data service.

11. The method of claim 7, wherein determining the availability of the network includes determining a utilization level of a network element.

12. The method of claim 7, further comprising, based on the availability, notifying the customer equipment whether the request for the service was granted.

13. A quality of service server, comprising:
a processor;
computer readable storage, accessible to the processor, the storage including processor executable program instructions for providing a network service, the program instructions including instructions to:
  receive a request from a customer equipment for a service over a packet-switched network;
  determine an availability of the network to provide the service at a selected quality of service level including a set of instructions to:
    estimate a value of a front end metric indicative of a metric for a front end of the network wherein the front end metric is selected from a group consisting of mean packet transfer delay, delay jitter, packet loss ratio, and packet error ratio and wherein the front end of the network includes a portion of the network between a digital subscriber line access multiplexer (DSLAM) and a gateway at a customer location; and
    estimate a value of a back end metric indicative of a metric for a back end of the network wherein the back end metric is selected from the group consisting of mean packet transfer delay, delay jitter, packet loss ratio, and packet error ratio wherein the back end of the network includes a portion of the network between a video server and the DSLAM; and
  provide the service when the availability indicates the selected quality of service level.

14. The server of claim 13, wherein the instructions to determine the availability include instructions to determine a current load on network elements providing the service.

15. The server of claim 13, further comprising instructions to enable the network when the front end metric and the back end metric meet a selected criterion.

16. The server of claim 13, wherein the selected quality of service level is different for a voice service and a data service.

17. The server of claim 13, further comprising instructions to notify, based on the availability, the customer equipment whether the request for the service was granted.

* * * * *